United States Patent

Matsuo et al.

[11] Patent Number: 5,837,357
[45] Date of Patent: Nov. 17, 1998

[54] MAGNETIC RECORDING MEDIUM HAVING A CARBON PROTECTIVE LAYER AND METHOD FOR MANUFACTURING THE SAME

[75] Inventors: Souta Matsuo; Hiroshi Minazawa; Masaki Miyazato; Yoshiharu Kashiwakura, all of Nagano, Japan

[73] Assignee: Fuji Electric Co., Ltd., Japan

[21] Appl. No.: 744,648

[22] Filed: Nov. 6, 1996

[30] Foreign Application Priority Data

Nov. 6, 1995 [JP] Japan .................................. 7-286985

[51] Int. Cl.$^6$ ....................................................... G11B 5/72
[52] U.S. Cl. .................. 428/212; 428/408; 428/694 TC; 428/900; 427/130; 427/131; 427/523; 427/577; 204/192.15
[58] Field of Search ............................ 428/408, 694 TC, 428/900, 212; 427/130, 131, 577, 523; 204/192.15

[56] References Cited

U.S. PATENT DOCUMENTS 5,227,211  7/1993  Eltookhy et al. ........................ 428/64
5,397,644  3/1995  Yamashita ............................. 428/408
5,637,393  6/1997  Ueda et al. ........................... 428/332

FOREIGN PATENT DOCUMENTS 5-143972  6/1993  Japan .
5-225556  9/1993  Japan .

Primary Examiner—Stevan A. Resan
Attorney, Agent, or Firm—Rossi & Associates

[57] ABSTRACT

A magnetic recording medium is provided that includes a non-magnetic base, a magnetic layer laminated on a non-magnetic base, a carbon protective layer containing hydrogen and laminated on the magnetic layer, and a lubrication layer formed by applying a liquid lubricant to the carbon protective layer. The carbon protective layer includes a surface layer containing nitrogen, and the composition ratios of nitrogen and hydrogen in the surface layer may be suitably controlled to optimum ranges.

9 Claims, 4 Drawing Sheets

MAGNETIC RECORDING MEDIUM HAVING A CARBON PROTECTIVE LAYER AND METHOD FOR MANUFACTURING THE SAME

FIELD OF THE INVENTION

The present invention relates to a magnetic recording medium, such as a magnetic disc, that is installed in a hard disc device, for example, and a method for manufacturing such a magnetic recording medium. In particular, this invention is concerned with the construction of a carbon protective layer adapted to protect a magnetic layer of the magnetic recording medium.

BACKGROUND OF THE INVENTION

A magnetic recording medium used with a fixed magnetic disc device, such as a hard disc drive, generally has a layered structure as shown in FIG. 7. More specifically, a non-magnetic metal layer 1b is formed in a non-magnetic substrate 1a to provide a non-magnetic base 1, and a non-magnetic metal base layer 2 is then laminated on this non-magnetic base 1. Thereafter, a magnetic layer 3 in the form of a thin film is laminated on the non-magnetic metal base layer 2, and a carbon protective layer 4 is formed on this magnetic layer 3. Further, a liquid lubricant is applied by coating onto the carbon protective layer 4 to thus form a lubricant layer 5.

The non-magnetic base 1 may be an alumite base, a glass base, or a ceramic base, or may be obtained by forming the non-magnetic metal layer 1b made of Ni and P on the non-magnetic substrate 1a made of an Al-Mg alloy by electroless plating. This non-magnetic base 1 is grounded (or finished by polishing) as needed, and its surface is roughened, i.e., provided with minute protrusions and recesses by texturing. Thereafter, the non-magnetic metal base layer 2 made of Cr and having a thickness of about 60 nm, magnetic layer 3 made of Co-Cr-Ta or the like and having a thickness of about 30 nm, and protective layer 4 made of carbon (C) and having a thickness of about 15 nm are successively formed by sputtering under an Ar atmosphere on the non-magnetic base 1 while it is being heated. The carbon protective layer 4 is then coated with a liquid lubricant containing perfluoropolyether, which forms the lubricant layer 5 having a thickness of about 2 nm.

When the magnetic recording medium (magnetic disc) constructed as described above is actually mounted in a hard disc drive, the disc is repeatedly brought into contact with a magnetic head of the disc drive. In this connection, the hard disc device or other device generally employs a contact-start-stop (CSS) system in which the magnetic head is held in contact with a radially inner region or CSS region of the surface of the magnetic disc while the disc drive is not operated, and the magnetic head slightly floats above the surface of the magnetic disc only when the disc drive is operated, so as to read and write information on a radially outer region or data region of the disc. The magnetic head and the magnetic disc are repeatedly brought into sliding contact with each other in the radially inner CSS region of the disc as a power supply of the disc drive is turned on and off. Consequently, the surface of the disc or medium surface wears off due to the sliding contact if it has insufficient wear resistance or lubrication characteristic, and the magnetic layer 3 may be broken or damaged if the medium surface wears off to a great extent, thereby making it impossible for the disc drive to perform reading and reproducing operations. To improve the wear resistance of the magnetic disc in view of this problem, the CSS region on the surface of the non-magnetic metal layer (Ni-P plating) 1b is provided with roughness, i.e., protrusions and recesses, by forming grooves textured in the circumferential direction of the layer 1b, such that the roughness is reflected at the surface of the protective layer 4.

The protective layer 4 is formed on the surface of the magnetic layer 3 so as to protect the magnetic layer 3 against frictions or the like due to sliding actions of the magnetic head. In addition, a liquid lubricant is applied to the surface of the protective layer 4 to form the lubrication layer 5. In the case of a magnetic disc having a relatively small diameter of 5 inch or less, carbon (C) is generally used as a material for the protective layer 4, and such a carbon protective layer is often formed by sputtering in an Ar atmosphere. One reason why carbon is employed for forming the protective layer is that an amorphous carbon (a-C) protective layer formed by sputtering has relatively strong graphite bonding, and therefore exhibits a low coefficient of friction in an atmosphere containing water, which is a characteristic peculiar to graphite. The amorphous carbon protective layer, however, has excessively low hardness as compared with a hard ceramic material used as a slider material of a thin-film head or MIG head, and is thus likely to suffer from wear due to its contact with such a hard slider.

In recent years, therefore, a diamond-like property, i.e., high hardness, has been developed in the material for the carbon protective layer, and a film of diamond-like carbon (DLC) having a high percentage of diamond bonding has been formed on the magnetic layer 4 to form the protective layer 5. This diamond-like carbon film exhibits a high degree of hardness due to its diamond structure ($SP^3$) in addition to an excellent sliding property of carbon, assuring improved wear resistance to the slider having high hardness.

The DLC film as described above is generally obtained by sputtering a carbon target with a mixed atmosphere of Ar gas, and hydrocarbon (methane, acetone, alcohol, etc.) containing gas or hydrogen gas. It is generally known that the carbon film is hardened and turned into the DLC film if a fixed amount of hydrogen is incorporated in the carbon film, and that the carbon film exhibits a polymer-like property and is gradually softened if an excessive amount of hydrogen is incorporated in the film.

To evaluate the crystalline structure of the DLC film, the Raman spectrum of the DLC film may be observed in terms of the fluorescent strength ratio (B/A) and the peak strength ratio (Id/Ig). The graph of FIG. 8 indicates the fluorescent strength ratio (B/A) and peak strength ratio (Id/Ig) in the Raman spectrum (solid line) of the DLC protective layer as measured with an Ar ion laser beam having a wavelength of 514.5 nm. As shown in FIG. 8, the Raman spectrum (antistokes line) has a peak (hereinafter referred to as "G peak") due to graphite on the high-frequency side (1555–1570 $cm^{-1}$), and a peak (hereinafter referred to as "D peak") due to irregularity of the crystal structure or microcrystallization on the low-frequency side (1380–1400 $cm^{-1}$), and the amorphous carbon film has a relatively high D peak. In FIG. 8, region "S" on the lower side of straight line "L" connecting bottoms on both sides of the G peak indicates a fluorescent portion of the Raman spectrum. Accordingly, the fluorescent strength ratio of the DLC protective layer is a ratio (B/A) of the overall peak value B that includes the fluorescent portion to a substantial peak value A that excludes the fluorescent portion and is measured at the G peak. The background (region S) of the Raman spectrum that is shown as the fluorescent portion represents polymer bonding due to incorporation of hydrogen into the DLC protective layer, and a higher fluorescent strength ratio B/A ($\geq 1$) means a larger content of hydrogen in the DLC protective layer, which results in a higher percentage of hydrocarbon containing polymer. After the background (region S) due to fluorescence is removed by linear approximation from the Raman spectrum (solid line), the resulting spectrum is subjected to wave separation according to the Gaussian function to be divided in to the D peak (broken line) and the G peak (broken line), so as to obtain the peak strength ratio (Id/Ig) that is the ratio of the D peak value Id to the G peak value Ig. The peak strength ratio (Id/Ig) represents a degree of micro-crystallization.

In a hard disc device, volatile low-molecule organic gases, such as sulfuric acid, chlorine or dioctyl phthalate, and acrylic acid, are released in a certain ratio from organic materials including various adhesives and plastic materials used in the device. If the magnetic recording medium adsorbs these organic gases at a high temperature and a high humidity, the liquid lubricant of the lubrication layer 5 may be decomposed, and the resulting decomposed product is attached to a slider or pole tip element of the magnetic head when the head is brought into slight contact with the medium surface at a certain probability while it is floating and running above the medium with a low floating amount (e.g., 50 nm or smaller). A phenomenon in which the decomposed product is attached to the head is called "head smear phenomenon" (head contamination). When the head smear phenomena occur, output characteristics of the magnetic head are lowered, and floating characteristics of the head become unstable, causing wear of the protective layer 4, for example. It is found that the head smear phenomena are likely to occur with a medium surface having a high gas adsorbing property.

SUMMARY OF THE INVENTION

In view of the above problems, it is a first object of the present invention to provide a magnetic recording medium that can avoid head smear phenomena by reducing the gas adsorbing property of a surface of a carbon protective layer, and a method for manufacturing such a recording medium. It is a second object of the invention to provide a magnetic recording medium that can avoid head smear phenomena without affecting the CSS durability, and a method for manufacturing such a recording medium. It is a third object of the invention to provide a magnetic recording medium that can avoid head smear phenomena while assuring improved CSS durability and high reliability, and a method for manufacturing such a recording medium.

To accomplish the first object, the present invention is characterized in that a diamond-like carbon protective layer is covered with another diamond-like carbon protective layer containing nitrogen, so as to reduce the gas adsorbing property of the protective layer itself. Thus, there is provided a magnetic recording medium which comprises: a non-magnetic base; a magnetic layer laminated on the non-magnetic base; a carbon protective layer (DLC protective layer) containing hydrogen and laminated on the magnetic layer, the carbon protective layer including a surface layer containing nitrogen; and a lubrication layer formed by applying a liquid lubricant to the carbon protective layer.

It is found that the head smears can be effectively suppressed due to the carbon protective layer having a double-layered structure wherein a DLC protective layer containing nitrogen is laminated on another DLC protective layer. Further, the present magnetic recording medium exhibits excellent CSS durability due to the double-layered structure including the DLC protective layer in addition to the DLC protective layer containing nitrogen, as compared with a single-layered structure consisting solely of the DLC protective layer containing nitrogen.

In the magnetic recording medium as described above, the composition ratio of nitrogen X in a binary composition $C_{1-x}N_x$ of carbon and nitrogen contained in the surface layer is preferably not smaller than 7% when measured at a surface thereof, and the composition ratio of hydrogen with respect to all elements contained in the surface layer is preferably not larger than 40 at %, in view of the fact that the balance of the nitrogen and hydrogen concentration is related to a degree by which the head smear phenomena are suppressed or avoided. In this case, the head smears can be almost completely eliminated. When the DLC surface layer having the above ranges of nitrogen and hydrogen is observed by Raman spectroscopy using an Ar ion laser beam having a wavelength of 514.5 nm, the peak strength ratio (Id/Ig) of the Raman spectrum is not smaller than 0.8, and the fluorescent strength ratio (B/A) of the Raman spectrum is not larger than 2.0.

To accomplish the second object, it is preferable that the composition ratio of nitrogen X is not larger than 20 at % when measured at the surface, and the composition ratio of hydrogen is not smaller than 10 at %. In this case, the head smears can be avoided without affecting the CSS durability. When the DLC surface layer having the above ranges of nitrogen and hydrogen is observed by Raman spectroscopy using an Ar ion laser beam having a wavelength of 514.5 nm, the peak strength ratio (Id/Ig) of the Raman spectrum is not smaller than 1.1, and the fluorescent strength ratio (B/A) of the Raman spectrum is not larger than 1.8.

To accomplish the third object, the composition ratio of hydrogen is preferably not larger than 37 at %. In this case, the head smears can be avoided while assuring improved CSS durability at the same time. When the DLC surface layer having the above range of hydrogen is observed by Raman spectroscopy using an Ar ion laser beam with a wavelength of 514.5 nm, the fluorescent strength ratio (B/A) of the Raman spectrum is not larger than 1.8.

In the method for manufacturing the magnetic recording medium, the surface layer containing nitrogen may be formed in the carbon protective layer by sputtering under a mixed atmosphere of inert gas, nitrogen gas and one of hydrocarbon gas and hydrogen gas. The surface layer may be also formed by plasma CVD method rather than sputtering. In another method, nitrogen ions may be implanted into the surface of the DLC protective layer, so as to alter the surface layer of the protective layer.

BRIEF DESCRIPTION OF THE DRAWINGS

The present invention will be described in greater detail with reference to certain examples thereof and the accompanying drawings wherein.

DETAILED DESCRIPTION OF THE PRESENT INVENTION

Figure 1:
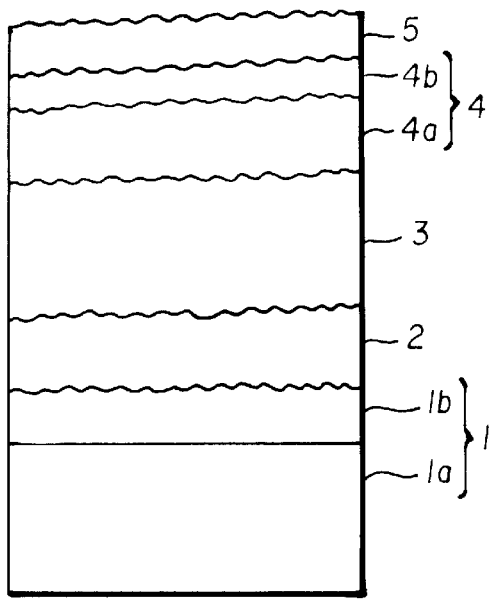
FIG. 1 is a cross sectional view showing a layered structure of a magnetic recording medium according to the present invention.

FIG. 1 is a cross sectional view showing a layered structure of a magnetic recording medium according to the present invention. To produce this magnetic recording medium, a non-magnetic metal layer 1b is formed on a non-magnetic substrate 1a to provide a non-magnetic base 1, and a non-magnetic metal base layer 2 is then laminated on the non-magnetic base 1, followed by forming a thin film of magnetic layer 3 on the non-magnetic metal base layer 2. Further, a first protective layer (lower layer) 4a is formed on the magnetic layer 3, and a second protective layer (upper layer) 4b is then formed on the first protective layer 4a, to thus provide a protective layer 4 having a double-layered structure. The second protective layer 4b is coated with a liquid lubricant that forms a lubricant layer 5. The first protective layer 4a consists of a carbon protective layer (diamond-like carbon protective layer) containing hydrogen, and the second protective layer 4b consists of a diamond-like carbon protective layer containing nitrogen. With nitrogen contained in this second protective layer 4b, head smear phenomena can be suppressed as described later.

The second protective layer 4b may be formed by sputtering under a mixed atmosphere of inert gas, nitrogen gas, and hydrocarbon or hydrogen gas, or formed by plasma CVD method under a mixed atmosphere of inert gas, nitrogen gas, and hydrocarbon or hydrogen gas. In another method, nitrogen ions may be implanted into the surface of the first protective layer 4a to alter the surface layer of the first protective layer 4a into the second protective layer 4b containing nitrogen.

With respect to the nitrogen-containing second carbon protective layer 4b of the magnetic recording medium produced in the above manner, the concentration of nitrogen in the film was measured by X-ray photo-emission spectroscopy (hereinafter referred to as ESCA), and represented by composition ratio of nitrogen X (at %) in a binary composition $C_{1-x}N_x$ of carbon and nitrogen as measured in relation with the depth, and the concentration of hydrogen was measured by hydrogen forward scattering method (hereinafter referred to as HFS) in which the surface of the film (4b) was bombarded with He and hydrogen scattered forward was trapped by a hydrogen detector. The thus measured concentration of hydrogen is represented by composition ratio of hydrogen (at %) with respect to all elements contained in the second carbon protective layer 4b. Further, the Raman spectrum of the second carbon protective layer 4b was observed by Raman spectrometry using an Ar ion laser beam having a wavelength of 514.4 nm, so as to obtain the fluorescent strength ratio (B/A) and peak strength ratio (Id/Ig).

Figure 2:
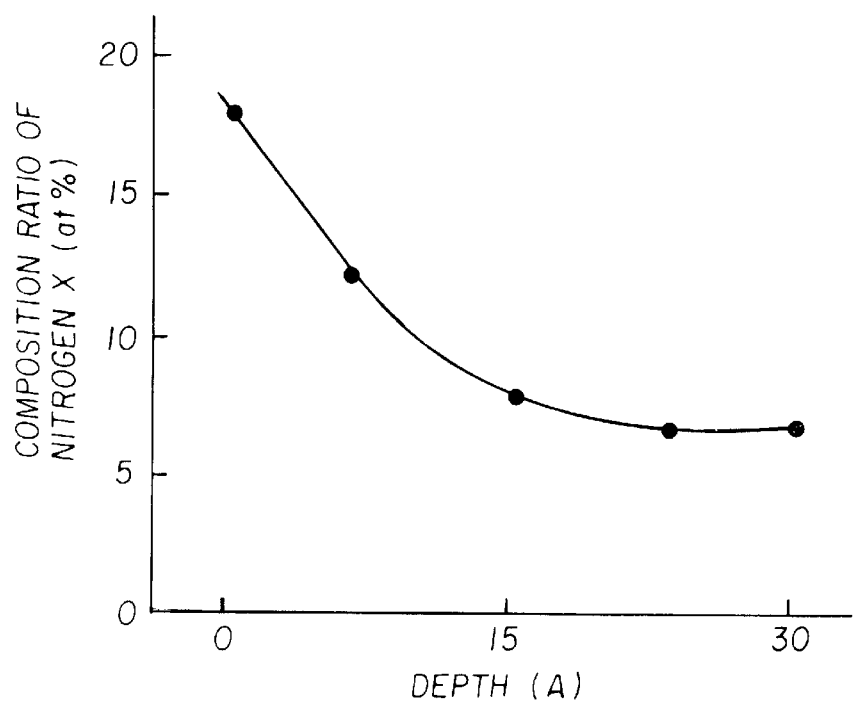
FIG. 2 is a graph showing the relationship of the composition ratio of nitrogen X (at %) in the binary composition $C_{1-x}N_x$ with respect to the depth (Å) as measured from a film surface of a diamond-like carbon protective layer containing nitrogen in the magnetic recording medium of the present invention.

FIG. 2 is a graph indicating the relationship of the composition ratio of nitrogen X (at %) in the binary composition $C_{1-x}N_x$ with respect to the depth (A) measured from the film surface of the diamond-like carbon protective layer 4b containing nitrogen. When the composition ratio of nitrogen X is about 18 at % at the surface of the protective layer 4b, the ratio X is reduced as the depth measured from the surface increases up to 15 Å, and becomes substantially constant when the depth is equal to or larger than 15 Å. To stabilize the concentration of nitrogen in the carbon protective layer 4b, therefore, the film thickness of the carbon protective layer 4b is preferably controlled to be 15 Å or greater in view of a requirement for the uniformity of the concentration gradient in the film.

Figure 3:
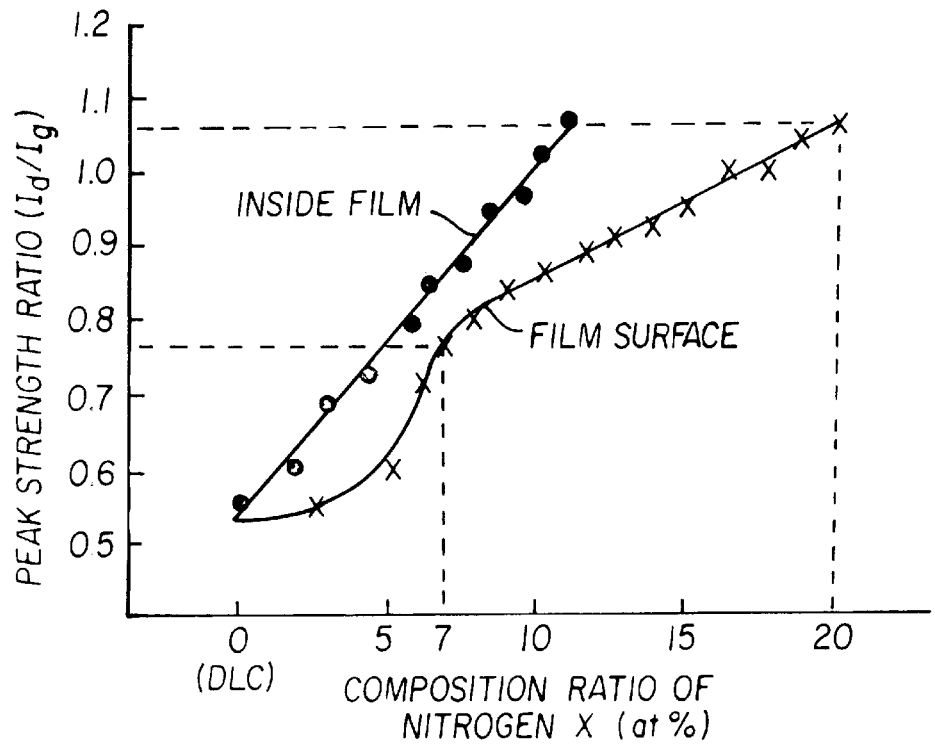
FIG. 3 is a graph showing the relationship of the peak strength ratio (Id/Ig) with respect to the composition ratio of nitrogen X (at %) in the binary composition $C_{1-x}N_x$ of the diamond-like carbon protective layer containing nitrogen in the magnetic recording medium of the present invention.

FIG. 3 is a graph showing the relationship of the peak strength ratio (Id/Ig) with respect to the composition ratio of nitrogen X (at %) in the binary composition $C_{1-x}N_x$ of the diamond-like carbon protective layer 4b containing nitrogen. In the graph, "X" marks represent values (Id/Ig) measured at the film surface of the protective layer 4b, and "" marks represent values (Id/Ig) measured at the depth of 15 Å from the film surface of the protective layer 4b. The peak strength ratio obtained when the composition ratio of nitrogen X is equal to 0 is that of a DLC film containing no nitrogen. As shown in the graph of FIG. 3, the peak strength ratio (Id/Ig) is rapidly increased when the composition ratio of nitrogen X measured at the film surface is in the range of 0 to 7 at %, and is linearly increased when the composition ratio of nitrogen X measured at the film surface becomes equal to or greater than 7 at %. It will be thus understood that the composition ratio of nitrogen X can be controlled using an index of the peak strength ratio (Id/Ig) once the ratio X exceeds 7 at %. As the composition ratio of nitrogen X measured inside the film (at the depth of 15 Å) increases, on the other hand, the peak strength ratio (Id/Ig) is linearly increased with respect to the entire range of the ratio X. While the peak strength ratio (Id/Ig) varies differently at the film surface and inside the film while the composition ratio of nitrogen X is in the range of 0 to 0.7 at %, the ratios (Id/Ig) measured at the film surface and inside the film are both linearly increased when the composition ratio of nitrogen X is 7 at % or larger, and thus strongly correlated with each other. Accordingly, when the composition ratio of nitrogen at the surface is 7 at % or larger, the composition ratio of nitrogen inside the film can be exclusively specified by defining the composition ratio of nitrogen at the surface, and the peak strength ratio (Id/Ig) can be used as the index, instead of the composition ratio of nitrogen X.

Figure 4:
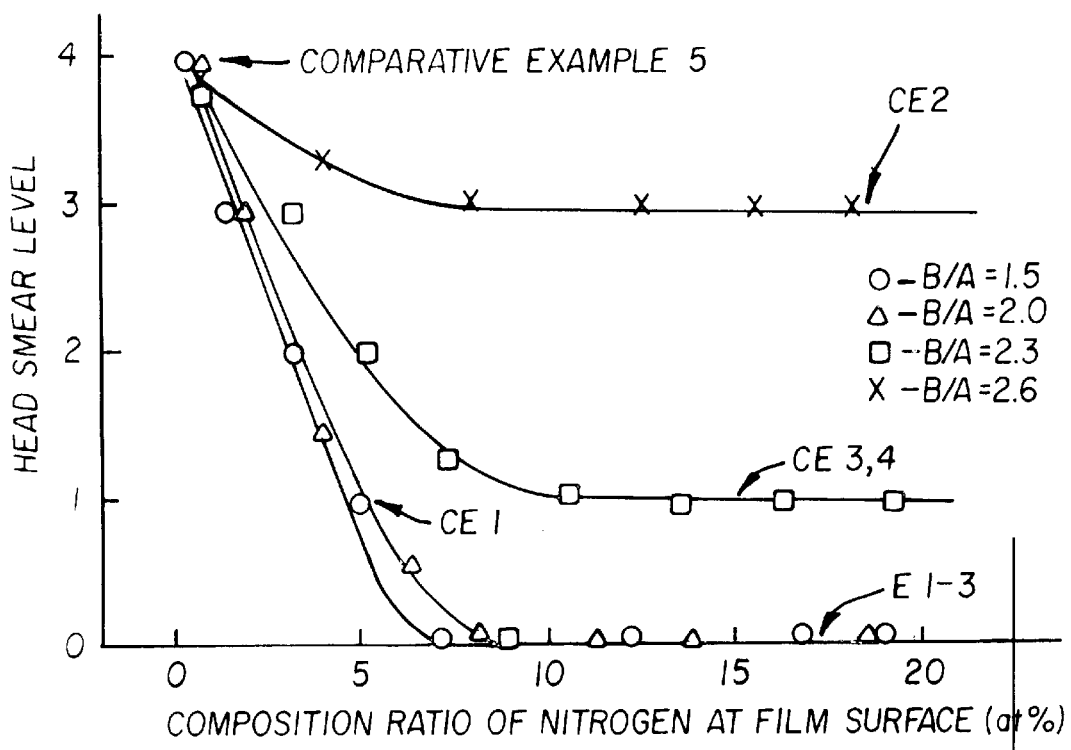
FIG. 4 is a graph showing the relationship of the head smear level (evaluation level) with respect to the composition ratio of nitrogen X (at %) in the binary composition $C_{1-x}N_x$ of the diamond-like carbon protective layer containing nitrogen in the magnetic recording medium of the present invention.

FIG. 4 is a graph showing the relationship of the head smear level (evaluation level) with respect to the composition ratio of nitrogen X (at %) in the binary composition $C_{1-x}N_x$ of the film surface of the diamond-like carbon protective layer 4b containing nitrogen. To evaluate the head smear level, a CSS durability test was conducted using a thin film head of $Al_2O_3$-TiC slider operated with a 50%-size head load of 4 g and a floating amount of 50 nm. To determine whether any substance was attached to the head during seeking, the recording medium was incorporated in a disc drive, and its motor was driven in an atmosphere having a temperature of 50° C. and a humidity of 80%RH, to effect a random seek operation over radially inner and outer regions of the medium with the head floating above the medium. After this seek test was conducted for eight days, one surface of the slider was observed to examine the presence of substances attached to the head and any damage or corrosion of a pole tip element of the head. The level "1" related to head smears indicates that no substance was attached to the head, and level "1" indicates that substances were attached to within 20% of the entire area of the head surface, while level "2" indicates that substances were attached to 20%–40% of the head surface area. The level "3" indicates that substances were attached to 40%–60% of the head surface area, and the level "4" indicates that substances were attached to 60% or greater of the head surface area.

It will be understood from the graph of FIG. 4 that the head smear level is reduced with an increase of nitrogen doped in the recording medium, irrespective of the fluorescent strength ratio (B/A). It is thus proved that doping the DLC film with nitrogen is effective to suppress the head smears. The reduction of the head smear level, however, is saturated or stopped once the composition ratio of nitrogen X exceeds a predetermined value, which means that doping of excessive nitrogen is not necessary. Where the fluorescent strength ratio (B/A) is 1.5 (as indicated by "o" marks), the head smear level becomes zero once the composition ratio of nitrogen X at the film surface exceeds 7 at %. Where the fluorescent strength ratio (B/A) is 2.0 (as indicated by "Δ"), the head smear level becomes zero once the composition ratio of nitrogen X at the film surface exceeds about 9 at %.

Where the fluorescent strength ratio (B/A) is 2.3 (as indicated by "□" marks), the head smears cannot be reduced below level "1" even with a considerable increase in the composition ratio of nitrogen X. In this connection, the peak strength ratio (Id/Ig) is about 0.8 when the composition ratio of nitrogen X is 7 at % at the film surface, as shown in the graph of FIG. 3. Thus, the head smears appear if the fluorescent strength ratio (B/A) is excessively large (if the hydrogen concentration is excessively large), even if the N composition X is controlled to be 7 at % or greater so as to avoid the head smears. It is thus found that the range of the composition ratio of nitrogen needs to be balanced with that of the composition ratio of hydrogen in order to suppress the head smears. It is particularly important to define or determine the lower limit value (7 at %) of the composition ratio of nitrogen X and the upper limit value of the composition ratio of hydrogen.

Figure 5:
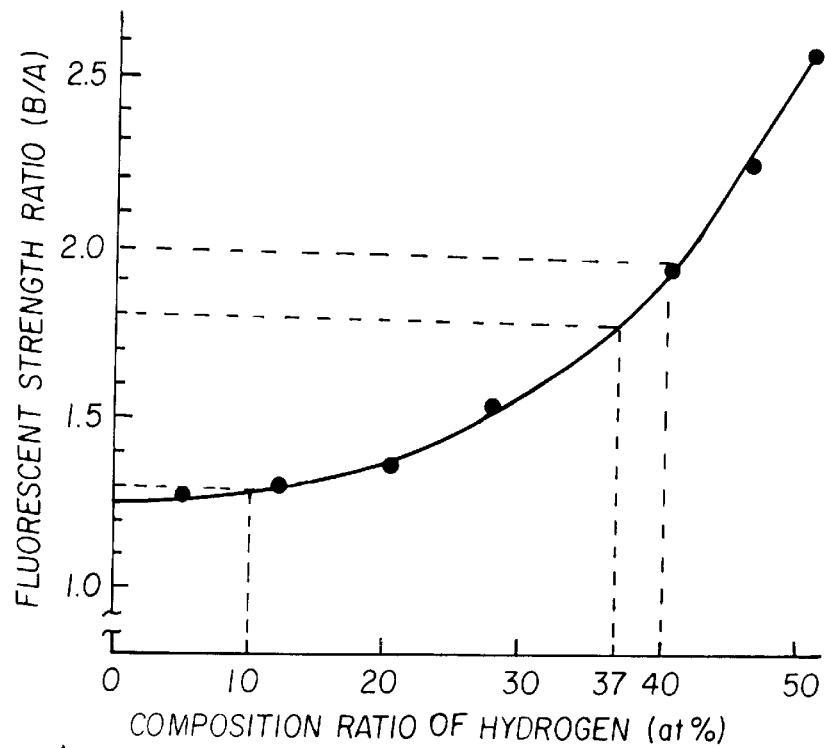
FIG. 5 is a graph showing the relationship between the composition ratio (at %) of hydrogen to all elements of the carbon protective layer and the fluorescent strength ratio (B/A)

It can be presumed from the graph of FIG. 4 that the upper limit value of the fluorescent strength ratio (B/A) for achieving head smear level "0" is less than 2.3 and around 2.0. While a precise upper limit value of (B/A) is considered to be present between 2.0 and 2.3, it suffices if the upper limit value is controlled to be 2.0. The graph of FIG. 5 shows the relationship between the composition ratio of hydrogen (at %) and the fluorescent strength ratio (B/A). Where the fluorescent strength ratio (B/A) is equal to 2.0, the composition ratio of hydrogen is 40 at %. It follows that the upper limit value of the composition ratio of hydrogen that does not cause head smears is 40 at %.

It is thus found that the conditions for avoiding head smears are that the composition ratio of nitrogen X in the binary composition $C_{1-x}N_x$ as measured at the film surface of the diamond-like carbon protective layer 4b is not smaller than 7 at %, and that the composition ratio of hydrogen with respect to all of the elements in the film (protective layer 4b) is not larger than 40 at %.

Figure 6:
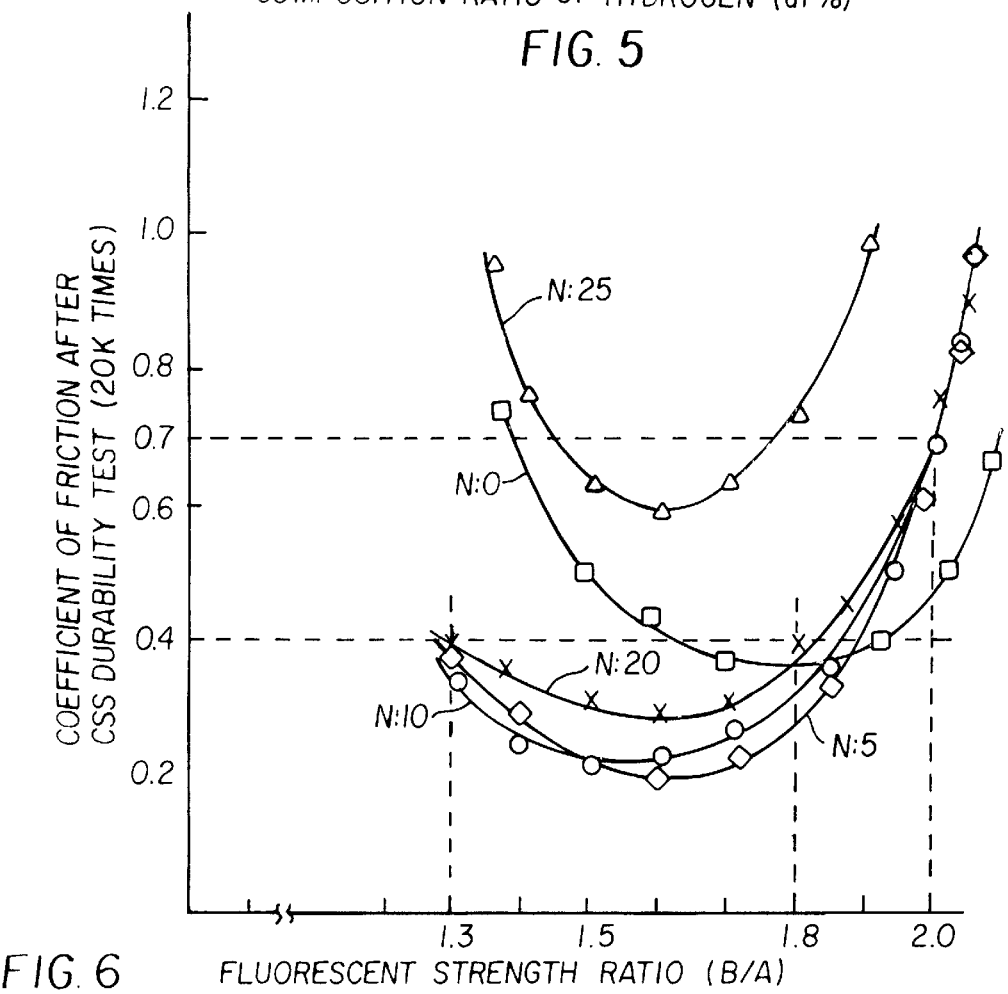
FIG. 6 is a graph showing the relationship of the coefficient of friction measured after CSS durability tests (20K times) with respect to the fluorescent strength ratio (B/A) of the diamond-like carbon protective layer containing nitrogen in the magnetic recording medium of the present invention.
Figure 7:
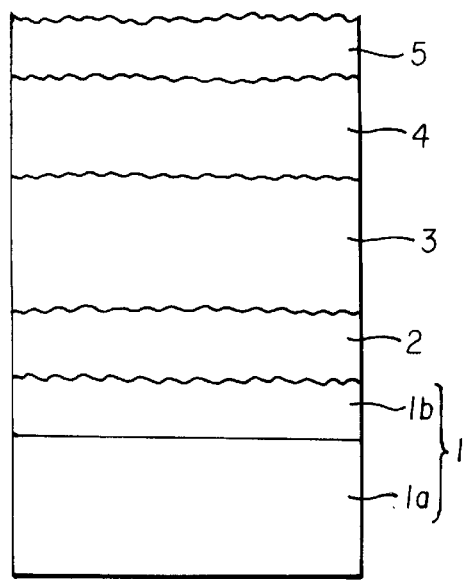
FIG. 7 is a cross sectional view showing a layered structure of a known magnetic recording medium.
Figure 8:
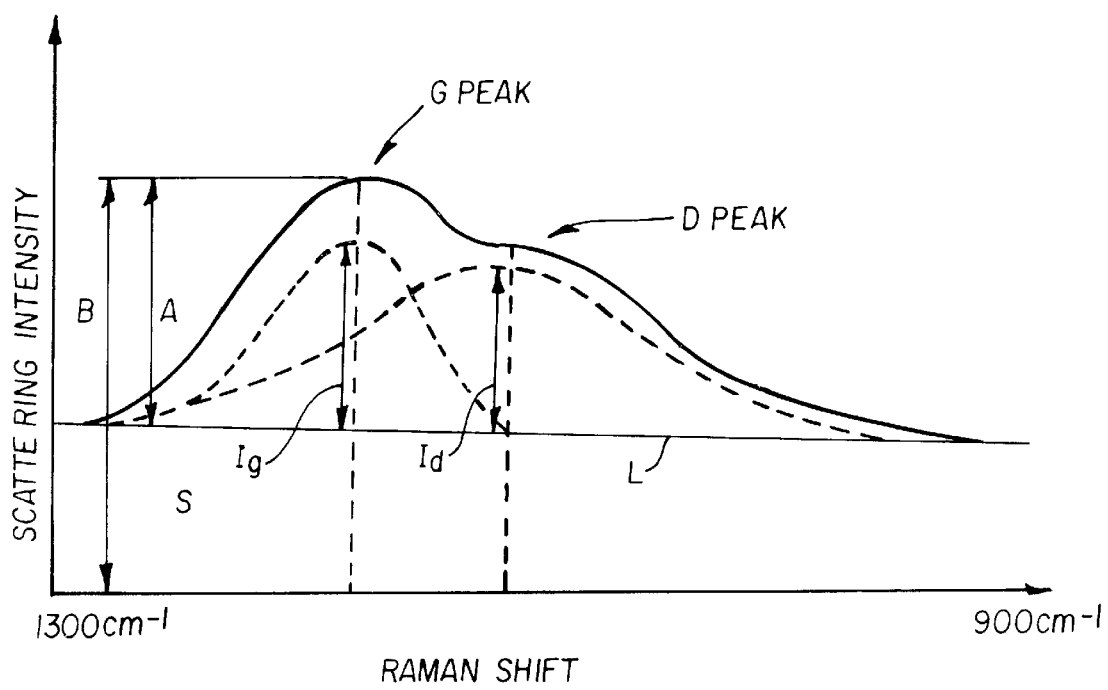
FIG. 8 is a graph showing the Raman spectrum of the DLC protective layer as measured with an Ar ion laser beam having a wavelength of 514.5 nm.

FIG. 6 is a graph showing the relationship between the fluorescent strength ratio (B/A) of the diamond-like carbon protective layer 4b containing nitrogen, and the coefficient of friction measured after the CSS durability test (20K times). As is understood from FIG. 6, the coefficient of friction is large when the fluorescent strength ratio (B/A) is close to 1 irrespective of the composition ratio of nitrogen, and that the coefficient of friction is minimized when the ratio (B/A) is around 1.5. The coefficient of friction is then increased as the ratio (B/A) becomes larger than around 1.5. It is also found that the coefficient of friction is reduced as the composition ratio of nitrogen is increased from zero, irrespective of the ratio (B/A), and its minimum value is about 0.2 when the composition ratio of nitrogen is in the range of 5–10 at %. As the composition ratio of nitrogen is further increased, however, the coefficient of friction is increased, which means that excessive nitrogen contained in the second protective layer 4b results in deterioration of the CSS durability. It is thus necessary to define the upper limit value of the composition ratio of nitrogen so as to assure a sufficiently high degree of CSS durability. The nitrogen contained in the protective layer 4b is deemed excessive when the composition ratio of nitrogen is 25 at % (as indicated by "Δ" marks), and the coefficient of friction in this case is apparently larger than that of the carbon protective layer containing no nitrogen (as indicated by "□" marks). In practical use, however, the coefficient of friction is allowed to be around 0.7, and the protective layer 4b containing 25 at % of nitrogen may be thus used provided the ratio (B/A) is around 1.5. To obtain the coefficient of friction that is apparently lower than that of the carbon protective layer containing no nitrogen (as indicated by "□" marks), the composition ratio of nitrogen is controlled to be in the range of 5 to 20 at % provided the ratio (B/A) is in the range of 1.3 to 1.8. After all, the lower limit value of the composition ratio of nitrogen needs to be 7 at % so as to avoid head smears, and the upper limit value of the composition ratio of nitrogen needs to be 20 at % so as to improve the CSS durability. As is understood from FIG. 3, the peak strength ratio (Id/Ig) is about 0.8 when the composition ratio of nitrogen at the film surface is 7 at %, and is about 1.1 when the composition ratio of nitrogen is 20 at %. It is also understood from FIG. 5 that the fluorescent strength ratio (B/A) is in the range of 1.3 to 1.8 when the composition ratio of hydrogen is in the range of 10 to 37 at %. It follows that the head smear phenomena can be suppressed if the composition ratio of nitrogen of the diamond-like carbon protective layer 4b is in the range of 7 to 20 at %, and the CSS durability can be improved as compared with the DLC film containing no nitrogen if the composition ratio of hydrogen is in the range of 10 to 37 at %. While FIG. 4 indicates that the head smear level can be lowered enough if the upper limit value of the fluorescent strength ratio (B/A) is 2.0, FIG. 6 also indicates that when the upper limit value of the ratio (B/A) is 2.0 with the composition ratio of nitrogen being in the range of 5 to 20 at %, the coefficient of friction is about 0.7, which does not cause any problem in practical use of the medium with the head. After all, the upper limit of the fluorescent strength ratio (B/A) may be 2.0 (with the composition ratio of hydrogen being 40 at %) unless the CSS durability is deteriorated in that range. It is also found desirable to control the ratio (B/A) to be equal to or smaller than 1.8 (with the composition ratio of hydrogen being 37 at %) so as to reduce the coefficient of friction as compared with the DLC film containing no nitrogen, and thus improve the CSS durability while avoiding head smears.

The first protective layer 4a consists of a known DLC film whose composition ratio of hydrogen is generally in the range of 20 to 50 (at %). The protective layer 4a may further contain 5 at % or less of oxygen.

EXAMPLES

Example 1

Initially, 10 μm-thickness non-magnetic metallic layer 1b made of Ni and P was formed on non-magnetic substrate 1a made of Al-Mg alloy by electroless plating, to provide non-magnetic base 1, and the surface of the base 1 was grounded by polishing so that the center line average roughness Ra as measured by a stylus surface roughness meter was controlled to about 20 Å. The surface of the non-magnetic base 1 was then textured with diamond slurry so as to exhibit a center line average roughness Ra of about 50 Å, and the base 1 thus textured was washed. After washing, a Cr layer as non-magnetic metal base layer 2 and a CoCrTa magnetic layer as magnetic layer 3 were formed with a carrier-type DC magnetron sputtering device. Thereafter, 70 Å-thickness first carbon protective layer 4a containing hydrogen was formed, and 30 Å-thickness second carbon protective layer 4b containing hydrogen and nitrogen was formed on the first carbon protective layer 4a. In the final step, a liquid lubricant containing perfluoropolyether (Z-dol manufactured by Ausimont) was applied by dipping so as to form 18 Å-thickness lubricant layer 5.

To form the first carbon protective layer 4a, a mixed gas of Ar and 25 wt %$CH_4$ was introduced into a chamber, and a carbon target was fed within the chamber held at a pressure of 5 mTorr, at a feed rate of 220 mm/min., with the flow rate of the mixed gas being 18 sccm and the discharge power density being 1.0 W/cm$^2$. In another chamber equipped with a mixer capable of independently controlling the ratio of a mixed gas of Ar, $H_2$ and $N_2$, the second carbon protective layer 4b was formed with a discharge power density of 0.4 W/cm$^2$ in a mixed gas having an Ar:$H_2$:$N_2$ ratio (wt%) of 40:40:20 and a flow rate of 5 sccm. The other conditions in which the second carbon protective layer 4b was formed were the same as with those in which the first carbon protective layer 4a was formed.

Example 2

The non-magnetic base 1, non-magnetic metal base layer 2, magnetic layer 3 and first carbon protective layer 4 were formed in the same manner as in Example 1. The second carbon protective layer 4b was formed by DC plasma CVD method with a discharge power of 700 W, in a chamber kept at a pressure of 0.2 mTorr and containing a mixed gas whose ratio (wt%) of Ar, $H_2$ and $N_2$ was 40:40:20. The lubrication layer 5 was formed in the same manner as in Example 1.

Example 3

The non-magnetic base 1, non-magnetic metal base layer 2, magnetic layer 3 and first carbon protective layer 4 were formed in the same manner as in Example 1. %1 The second carbon protective layer 4b was formed by implanting 3 KeV of $N^+$ ions into the surface of the first carbon protective layer 4a in a dose amount of $1\times10^{17}$ ion/cm$^2$ to alter the surface layer of the first carbon protective layer 4a with nitrogen. The lubrication layer 5 was formed in the same manner as in Example 1.

Comparative Example 1

The non-magnetic base 1, non-magnetic metal base layer 2, magnetic layer 3 and first carbon protective layer 4 were formed in the same manner as in Example 1. In another chamber equipped with a mixer capable of independently controlling the ratio of a mixed gas of Ar, $H_2$ and $N_2$, the second carbon protective layer 4b was formed with a discharge power density of 0.4 W/cm$^2$ in a mixed gas having an Ar:$H_2$:$N_2$ ratio (wt%) of 70:20:10 and a flow rate of 5 sccm. The other conditions in which the second carbon protective layer 4b was formed were the same as those in which the first carbon protective layer 4a was formed. The lubrication layer 5 was formed in the same manner as in Example 1.

Comparative Example 2

The non-magnetic base 1, non-magnetic metal base layer 2, magnetic layer 3 and first carbon protective layer 4 were formed in the same manner as in Example 1. In another chamber equipped with a mixer capable of independently controlling the ratio of a mixed gas of Ar, $H_2$ and $N_2$, the second carbon protective layer 4b was formed with a discharge power density of 0.4 W/cm$^2$ in a mixed gas having an Ar:$H_2$:$N_2$ ratio (wt%) of 30:50:20 and a flow rate of 5 sccm. The other conditions in which the second carbon protective layer 4b was formed were the same as those in which the first carbon protective layer 4a was formed. The lubrication layer 5 was formed in the same manner as in Example 1.

Comparative Example 3

The non-magnetic base 1, non-magnetic metal base layer 2, magnetic layer 3 and first carbon protective layer 4 were formed in the same manner as in Example 1. In another chamber equipped with a mixer capable of independently controlling the ratio of a mixed gas of Ar, $H_2$ and $N_2$, the second carbon protective layer 4b was formed with a discharge power density of 0.4 W/cm$^2$ in a mixed gas having an Ar:$H_2$:$N_2$ ratio (wt%) of 60:20:20 and a flow rate of 5 sccm. The other conditions in which the second carbon protective layer 4b was formed were the same as those in which the first carbon protective layer 4a was formed. The lubrication layer 5 was formed in the same manner as in Example 1.

Comparative Example 4

The non-magnetic base 1, non-magnetic metal base layer 2, and magnetic layer 3 were formed in the same manner as in Example 1. Then, a single DLC protective layer containing nitrogen was formed with a discharge power density of 1.0 W/cm$^2$ in a mixed gas having an Ar:$H_2$:$N_2$ ratio (wt%) of 40:40:20 and a flow rate of 15 sccm. The lubrication layer 5 was formed in the same manner as in Example 1.

Comparative Example 5

The non-magnetic base 1, non-magnetic metal base layer 2, and magnetic layer 3 were formed in the same manner as in Example 1. Then, a single DLC protective layer containing no nitrogen was formed by feeding a carbon target through a chamber into which a mixed gas of Ar and 25 wt % $CH_4$ was introduced at a flow rate of 15 sccm, with the discharge power density being 1.0 W/cm$^2$. The lubrication layer 5 was formed in the same manner as in Example 1.

Comparison Between Examples and Comparative Examples

Examples 1–3 and Comparative Examples 1–5 were analyzed and subjected to the above-described CSS durability test and seek test to determine the coefficient of friction and head smear level. The results of Examples 1–3 are shown in TABLE 1, and the results of Comparative Examples 1–3 are shown in TABLE 2, while the results of Comparative Examples 4 and 5 are shown in TABLE 3.

TABLE 1

|  | Example 1 | Example 2 | Example 3 |
|---|---|---|---|
| Protective film | | | |
| Second layer | DC sputtering | plasma CVD | $N^+$ implanting |
| First layer | DC sputtering | DC sputtering | DC sputtering |
| Sputtering gas composition wt % | Ar + 40% $H_2$ + 20% $N_2$ 30Å/ | Ar + 40% $CH_4$ + 20% $N_2$ 30Å/ | $N^+$ implanting 30Å/ |
| Second layer/First layer | Ar + 25% $CH_4$ 70Å | Ar + 25% $CH_4$ 70Å | Ar + 25% $CH_4$ 70Å |
| ESCA N composition $C_{1-x}N_x$ | 0.17 | 0.17 | 0.17 |
| ESCA N amount | | | |
| Surface | 17 (at %) | 17 (at %) | 17 (at %) |
| Inside film (average) | 8 (at %) | 8 (at %) | 8 (at %) |
| HFS H amount | | | |
| Second layer | 25 (at %) | 27 (at %) | 20 (at %) |
| First layer | 42 (at %) | 41 (at %) | 42 (at %) |
| Raman | First / Second | First / Second | First / Second |
| B/A | 1.48 / 1.89 | 1.50 / 1.90 | 1.45 / 1.87 |
| Id/Ig | 0.92 / 0.57 | 0.93 / 0.55 | 0.88 / 0.58 |
| Coefficient of friction after CSS (20k) | ⊚ 0.25 *1 | ⊚ 0.28 *1 | ⊚ 0.35 *1 |
| Head smear after seek test | Level 0 *2 | Level 0 *2 | Level 0 *2 |

*1 ⊚: $\mu \leq 0.40$, ○: $0.40 < \mu \leq 0.70$, Δ: $0.70 < \mu \leq 1.50$, X: $1.50 < \mu$ or wear
*2 Level 0: No substance was attached to the head.
Level 1: Smears appeared in 20% or less of the head.
Level 2: Smears appeared in 40% or less of the head.
Level 3: Smears appeared in 60% or less of the head.
Level 4: Smears appeared in more than 60% of the head.

TABLE 2

|  | Compara. Ex. 1 | Compara. Ex. 2 | Compara. Ex. 3 |
|---|---|---|---|
| Protective film | | | |
| Second layer | DC sputtering | DC sputtering | DC sputtering |
| First layer | DC sputtering | DC sputtering | DC sputtering |
| Sputtering gas Thickness | Ar + 20% $H_2$ + 10% $N_2$ 30Å/ | Ar + 50% $CH_4$ + 20% $N_2$ 30Å/ | Ar + 20% $H_2$ + 20% $N_2$ 30Å/ |
| Second layer/First layer | Ar + 25% $CH_4$ 70Å | Ar + 25% $CH_4$ 70Å | Ar + 25% $CH_4$ 70Å |
| ESCA N composition $C_{1-x}N_x$ | 0.05 | 0.17 | 0.17 |
| ESCA N amount | | | |
| Surface | 5.0 (at %) | 17.0 (at %) | 17.0 (at %) |
| Inside film (average) | 2 (at %) | 9 (at %) | 8 (at %) |
| HFS H amount | | | |
| Second layer | 25 (at %) | 50 (at %) | 5 (at %) |
| First layer | 42 (at %) | 42 (at %) | 41 (at %) |
| Raman | Second / First | Second / First | Second / First |
| B/A | 1.50 / 1.85 | 1.98 / 1.87 | 1.28 / 1.82 |
| Id/Ig | 0.60 / 0.55 | 0.99 / 0.58 | 0.90 / 0.55 |
| Coefficient of friction after CSS (20k) | ⊚ 0.32 *1 | Δ–○ 0.80 *1 | X Wear *1 |
| Head smear after seek test | Level 1 *2 | Level 3 *2 | Level 0 *2 |

*1 ⊚: $\mu \leq 0.40$, ○: $0.40 < \mu \leq 0.70$, Δ: $0.70 < \mu \leq 1.50$, X: $1.50 < \mu$ or wear
*2 Level 0: No substance was attached to the head.
Level 1: Smears appeared in 20% or less of the head.
Level 2: Smears appeared in 40% or less of the head.
Level 3: Smears appeared in 60% or less of the head.
Level 4: Smears appeared in more than 60% of the head.

TABLE 3

|  | Compara. Ex. 1 | Compara. Ex. 2 |
| --- | --- | --- |
| Protective film (Single layer) | DC sputtering | DC sputtering |
| Sputtering gas | Ar + 40% $H_2$ + 20% $N_2$ | Ar + 25% $CH_4$ |
| Thickness (Single layer) | 100Å | 100Å |
| ESCA N composi-tion $C_{1-x}N_x$ | 0.05 | — |
| ESCA N amount |  |  |
| Surface | 17.3 at % | — |
| Inside film (average) | — | — |
| HFS H amount | 25 (at %) | 42 (at %) |
| Raman single layer |  |  |
| B/A | 1.47 | 1.88 |
| Id/Ig | 0.93 | 0.68 |
| Coefficient of friction after CSS (20k) | ○ 0.44 *1 | ○ 0.45 *1 |
| Head smear after seek test | Level 0 *2 | Level 4 *2 |

*1 @: $\mu \leq 0.40$, ○: $0.40 < \mu \leq 0.70$, Δ: $0.70 < \mu \leq 1.50$, X: $1.50 < \mu$ or wear
*2 Level 0: No substance was attached to the head.
Level 1: Smears appeared in 20% or less of the head.
Level 2: Smears appeared in 40% or less of the head.
Level 3: Smears appeared in 60% or less of the head.
Level 4: Smears appeared in more than 60% of the head.

Example 1 and Comparative Example 1

While Example 1 and Comparative Example 1 have the same composition ratio of hydrogen of the diamond-like carbon protective layer 4b containing nitrogen, the composition ratio of nitrogen of Example 1 is 17 at % and the composition ratio of nitrogen of Comparative Example 1 is 5 at %. Although both of these examples exhibit a sufficiently small coefficient of friction and excellent CSS durability, it is noted that the coefficient of friction increases with a decrease in the composition ratio of nitrogen. Further, head smears result from Comparative Example 1 in which the composition ratio of nitrogen is relatively small.

Example 1 and Comparative Example 2

While Example 1 and Comparative Example 2 have the same composition ratio of nitrogen of the diamond-like carbon protective layer 4b containing nitrogen, the composition ratio of hydrogen of Example 1 is 25 at %, and the composition ratio of hydrogen of Comparative Example 2 is 50 at %. If the composition ratio of hydrogen is too large, head smears appear and the coefficient of friction in the CSS operation is increased.

Example 1 and Comparative Example 3

While Example 1 and Comparative Example 3 have the same composition ratio of nitrogen of the diamond-like carbon protective layer 4b containing nitrogen, the composition ratio of hydrogen of Comparative Example 3 is 4 at %. If the composition ratio of hydrogen is too small, the polymer property is weakened, and the coefficient of friction in the CSS operation is increased, resulting in wear of the medium.

Example 1 and Comparative Example 4

Comparative Example 4 has a single carbon protective layer whose film properties are similar to those of the diamond-like carbon protective layer 4b of Example 1 containing nitrogen. Although head smears do not appear in Comparative Example 4, the coefficient of friction in the CSS operation is increased.

Example 1 and Comparative Example 5

Comparative Example 5 has a single DLC film (known film) that does not contain nitrogen. In this comparative example, head smears appear to a great extent, and the coefficient of friction in the CSS operation is increased.

As explained above, the magnetic recording medium according to the present invention is characterized in that the second DLC protective layer containing nitrogen is laminated on the first DLC protective layer so as to provide the protective layer having a double-layered structure. This arrangement yields the following effects:

(1) With nitrogen contained in the protective layer, head smears can be effectively suppressed or avoided. Further, the present recording medium exhibits excellent CSS durability due to the double-layered structure in which the second DLC protective layer containing nitrogen is formed on the first DLC protective layer, as compared with a single-layered structure consisting solely of the second DLC protective layer containing nitrogen.

(2) Where the composition ratio of nitrogen X in the binary composition $C_{1-x}N_x$ at the film surface of the DLC protective layer containing nitrogen is not smaller than 7 at %, and the composition ratio of hydrogen with respect to all elements of the protective layer is not larger than 40 at %, the head smears can be substantially eliminated.

(3) Where the composition ratio of nitrogen X at the films surface is not larger than 20 at %, and the composition ratio of hydrogen is not smaller than 10 at %, the head smears can be suppressed without affecting the CSS durability.

(4) Where the composition ratio of hydrogen is not larger than 37 at %, the head smears can be suppressed while the CSS durability can be improved at the same time.

What is claimed is:

1. A magnetic recording medium comprising:
    a non-magnetic base;
    a magnetic layer laminated on said non-magnetic base;
    a carbon protective layer containing hydrogen and laminated on said magnetic layer, said carbon protective layer including a surface layer opposite said magnetic layer that comprises a binary composition $C_{1-x}N_x$, in which X is not smaller than 0.07 when measured at the surface thereof, wherein an amount of hydrogen with respect to all elements contained in said surface layer is not larger than 40 at %; and
    a lubrication layer formed by applying a liquid lubricant to said carbon protective layer.

2. A magnetic recording medium according to claim 1, wherein X is not larger than 20 at % when measured at said surface, and the amount of hydrogen is not smaller than 10 at %.

3. A magnetic recording medium according to claim 2, wherein the amount of hydrogen is not larger than 37 at %.

4. A magnetic recording medium comprising:
    a non-magnetic base;
    a magnetic layer laminated on said non-magnetic base;
    a carbon protective layer containing hydrogen and laminated on said magnetic layer, said carbon protective layer including a surface layer opposite said magnetic layer that comprises a binary composition $C_{1-x}N_x$ in which X is not smaller than 0.07 when measured at the surface thereof, wherein an amount of hydrogen with respect to all elements contained in said surface layer is not larger than 40 at %; and a lubrication layer formed by applying a liquid lubricant to said carbon protective layer wherein the peak strength ratio (Id/Ig) of a Raman spectrum of said surface layer containing binary composition is not smaller than 0.8, and the fluorescent strength ratio (B/A) of the Raman spectrum of said surface layer containing binary composition is not larger than 2.0.

5. A magnetic recording medium according to claim 4, wherein said peak strength ratio (Id/Ig) is not larger than 1.1, and said fluorescent strength ratio (B/A) is not smaller than 1.3.

6. A magnetic recording medium according to claim 5, wherein said fluorescent strength ratio (B/A) is not larger than 1.8.

7. A method for manufacturing a magnetic recording medium comprising the steps of:

laminating a magnetic layer on a non-magnetic base;

laminating a carbon protective layer containing hydrogen on said magnetic layer;

forming a surface layer containing nitrogen in said carbon protective layer by sputtering under a mixed atmosphere of inert gas, nitrogen gas and one of hydrocarbon gas and hydrogen gas; and applying a liquid lubricant to said carbon protective layer so as to form a lubrication layer;

wherein the surface layer comprises a binary composition $C_{1-x}N_x$, in which X is not smaller than 0.07 when measured at the surface thereof, wherein an amount of hydrogen with respect to all elements contained in said surface layer is not larger than 40 at %.

8. A method for manufacturing a magnetic recording medium comprising the steps of:

laminating a magnetic layer on a non-magnetic base;

laminating a carbon protective layer containing hydrogen on said magnetic layer; forming a surface layer containing nitrogen in said carbon protective layer by a plasma CVD method under a mixed atmosphere of inert gas, nitrogen gas and one of hydrocarbon gas and hydrogen gas; and applying a liquid lubricant to said carbon protective layer so as to form a lubrication layer;

wherein the surface layer comprises a binary composition $C_{1-x}N_x$, in which X is not smaller than 0.07 when measured at the surface thereof, wherein an amount of hydrogen with respect to all elements contained in said surface layer is not larger than 40 at %.

9. A method for manufacturing a magnetic recording medium comprising the steps of:

laminating a magnetic layer on a non-magnetic base;

laminating a carbon protective layer containing hydrogen on said magnetic layer;

implanting nitrogen ions in a surface of said carbon protective layer containing hydrogen to alter a surface layer of the carbon protective layer so that said surface layer contains nitrogen; and applying a liquid lubricant to said carbon protective layer so as to form a lubrication layer;

wherein the surface layer comprises a binary composition $C_{1-x}N_x$ in which X is not smaller than 0.07 when measured at the surface thereof, wherein an amount of hydrogen with respect to all elements contained in said surface layer is not larger than 40 at %.

* * * * *